(12) United States Patent
Nydam et al.

(10) Patent No.: US 8,162,387 B1
(45) Date of Patent: Apr. 24, 2012

(54) BODY PANEL SUPPORT BRACKET

(75) Inventors: Scott Nydam, Farmington Hills, MI (US); Tom Domlovil, Farmington Hills, MI (US); Chris Martin, Brandon, MS (US); Mike Speer, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/976,260

(22) Filed: Dec. 22, 2010

(51) Int. Cl.
*B62D 25/10* (2006.01)

(52) U.S. Cl. .................. 296/193.11; 296/198; 180/69.21

(58) Field of Classification Search .................. 296/198, 296/193.11, 107.07, 146.14, 146.16; 180/69.21
See application file for complete search history.

(56) References Cited

U.S. PATENT DOCUMENTS

| | | | |
|---|---|---|---|
| 7,036,874 B2 | 5/2006 | Stojkovic et al. | |
| 7,413,239 B2 * | 8/2008 | Mitsuyama | 296/187.04 |
| 7,594,692 B2 | 9/2009 | Shishido | |
| 7,681,892 B1 | 3/2010 | Crews et al. | |

FOREIGN PATENT DOCUMENTS

JP 2002187571 * 7/2002

* cited by examiner

*Primary Examiner* — Dennis Pedder
(74) *Attorney, Agent, or Firm* — Young Basile Hanlon & MacFarlane P.C.

(57) ABSTRACT

Disclosed herein are embodiments of a body structure of a vehicle incorporating a body panel support bracket. In one embodiment, a body structure for a vehicle comprises a first body panel having a cantilevered portion and a second body panel adjacent the first body panel. A panel hinge has a hinge arm attached to the second body panel and a base portion. The cantilevered portion of the first body panel extends over a portion of the panel hinge. A body panel support bracket is attached to the base portion of the panel hinge and comprises a body panel support portion configured to support the cantilevered portion of the first body panel.

22 Claims, 5 Drawing Sheets

US 8,162,387 B1

BODY PANEL SUPPORT BRACKET

TECHNICAL FIELD

The present invention relates in general to a support bracket for a vehicle body panel, and in particular to a cantilevered panel portion.

BACKGROUND

To maintain an aesthetic parting line between body panels of vehicles, such as a hood panel and a fender panel, while accommodating a hinge on one of the body panels, styling can require a cantilevered portion of the non-hinged panel to protrude inboard over the panel hinge. Due to the relation of the cantilevered portion to the other body panel, the cantilevered portion is difficult to provide with sufficient support to receive minimal force without deflection. This inability to resist minimal force without deflection can be falsely perceived as low quality.

SUMMARY

Disclosed herein are embodiments of a body structure of a vehicle incorporating a body panel support bracket. In one embodiment, a body structure for a vehicle comprises a first body panel having a cantilevered portion and a second body panel adjacent the first body panel. A panel hinge has a hinge arm attached to the second body panel and a base portion. The cantilevered portion of the first body panel extends over a portion of the panel hinge. A body panel support bracket is attached to the base portion of the panel hinge and comprises a body panel support portion configured to support the cantilevered portion of the first body panel.

Another embodiment of a body structure of a vehicle disclosed herein comprises a hood ledge and a hood hinge supported by the hood ledge. The hood hinge includes a base portion and a hinge arm connected to the base portion at a pivot. A hood panel is movably supported by the hood hinge. A fender panel adjacent the hood ledge has a first attachment portion attached to the hood ledge at a first location and a second attachment portion attached to the hood ledge at a second location spaced apart from the first location, and has a cantilevered portion located between the first attachment portion and the second attachment portion with the cantilevered portion extending over a portion of the hood hinge. A fender support bracket comprises a bracket mounting portion attached to the base portion of the hood hinge, a body portion extending from the bracket mounting portion and a fender support portion extending from the body portion and positioned to support a distal end of the cantilevered portion of the fender panel.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
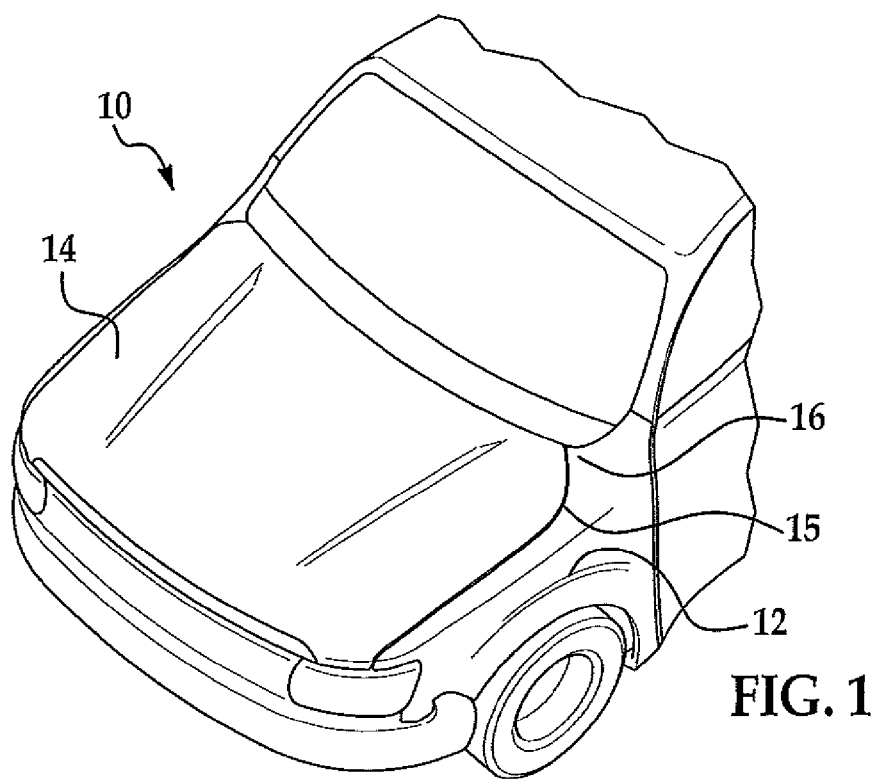
FIG. 1 is a front elevational view of the fender panel and hood panel.
Figure 2:
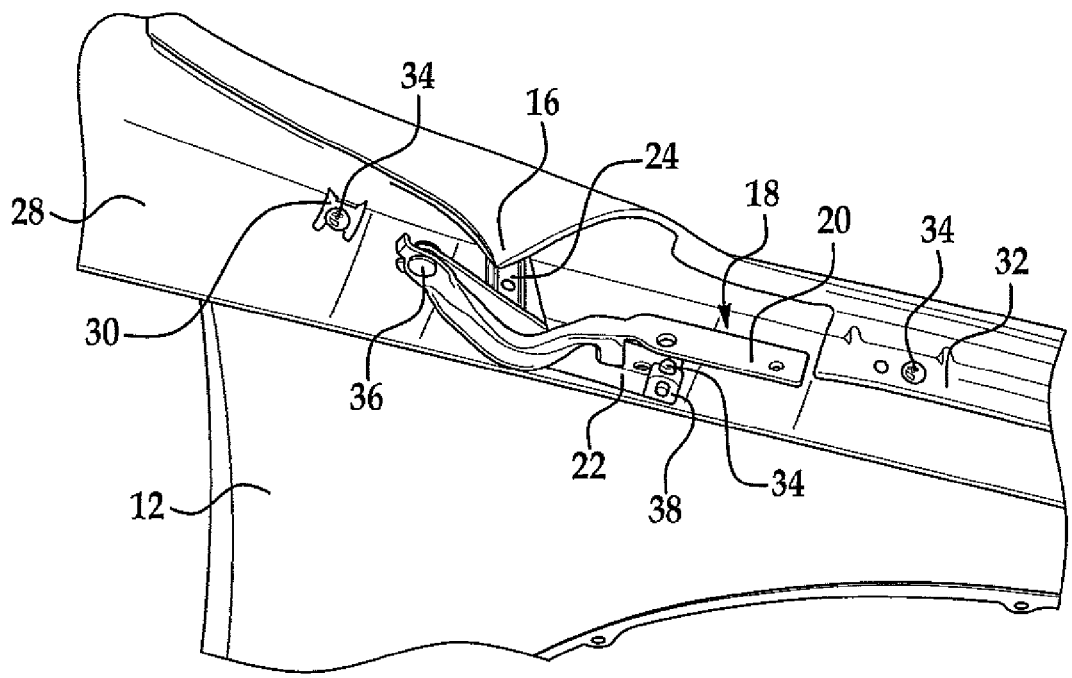
FIG. 2 is an inner side elevational view of the fender panel, hood hinge, and the fender support bracket disclosed herein.
Figure 3:
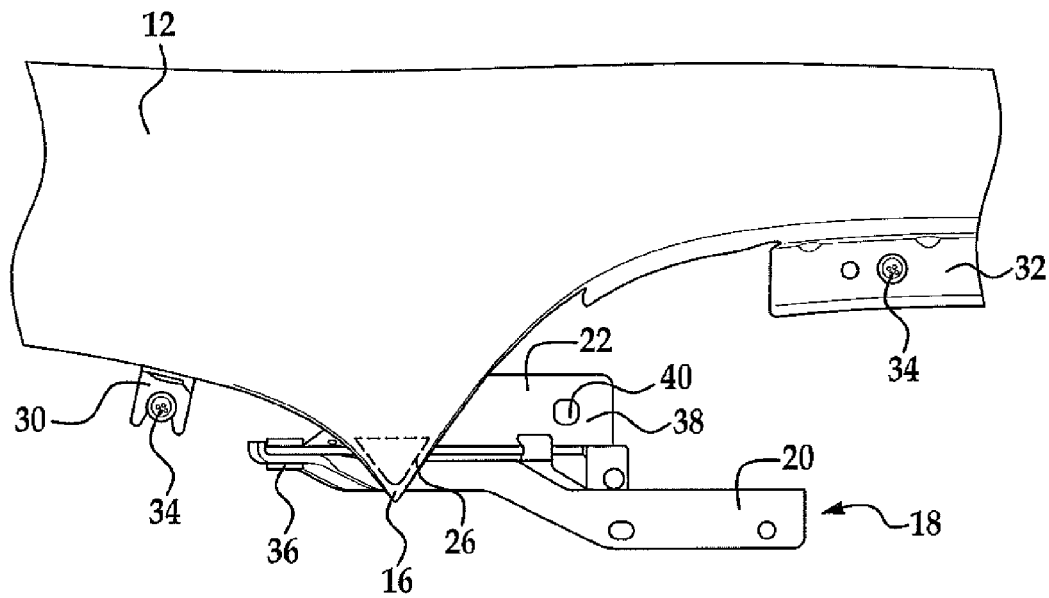
FIG. 3 is a top view of the fender panel, hood hinge, and the fender support bracket, with the support surface of the fender support bracket shown in hidden line.

FIG. 1 is an elevational view of the body structure 10 of a vehicle. The body structure 10 comprises a first body panel 12, shown here by example as a fender panel, and a second body panel 14 adjacent the first body panel 12, shown here by example as a hood panel. The first and second body panels 12, 14 define a parting line 15 between them. The first body panel 12 has a cantilevered portion 16. The second body panel 14 is attached to a panel hinge 18 to allow for movement of the second body panel 14. FIG. 2 is an elevational view of the first body panel 12 from within the body structure 10 showing the panel hinge 18. The panel hinge 18 can have a hinge arm 20 attachable to the second body panel 14 and a base portion 22. As best seen in FIG. 3, the cantilevered portion 16 of the first body panel 12 extends over a portion of the panel hinge 18. This extension of the cantilevered portion 16 over the panel hinge 18 obstructs a rigid mounting point for the cantilevered section 16.

Figure 4:
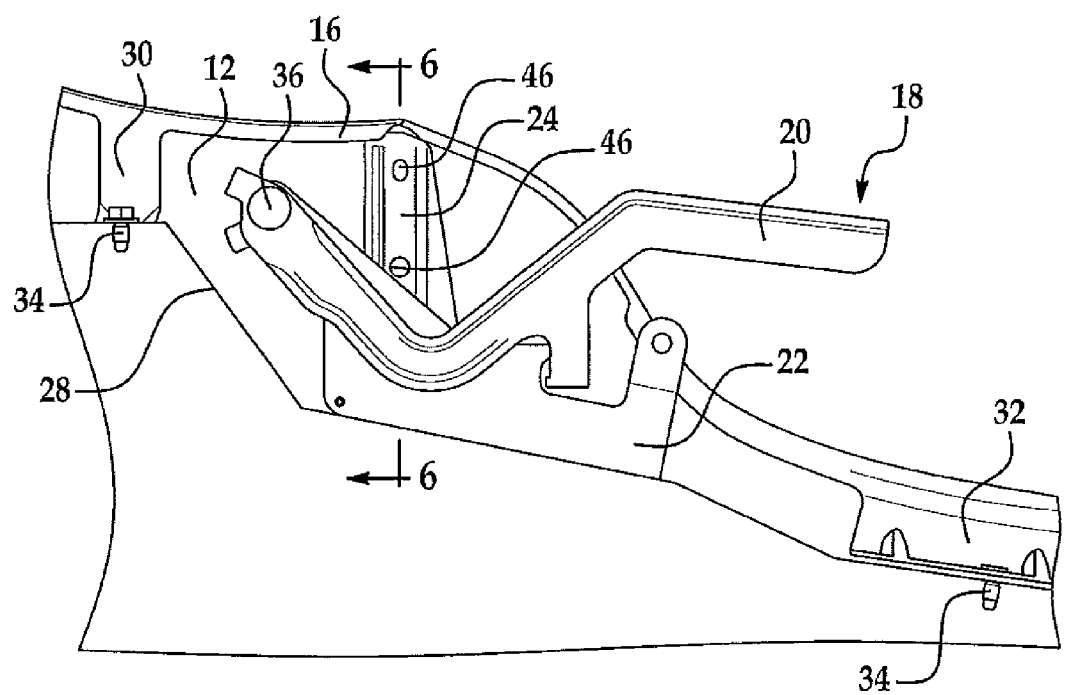
FIG. 4 is an inner side perspective view of the fender panel, hood hinge, and fender support bracket.

A body panel support bracket 24, partially seen in FIGS. 2 and 4, is attached to the base portion 22 of the panel hinge 18. The body panel support bracket 24 has a body panel support portion 26 configured to support the cantilevered portion 16 of the first body panel 12. In FIG. 3, the body panel support portion 26 is shown in hidden line under the cantilevered portion 16. The body panel support portion 26 can support the furthest part, such as distal end 52, of the cantilevered portion 16 of the first body panel 12 from where the first body panel 12 is mounted. The body panel support portion 26 can extend in any direction of the cantilevered portion 16 so long as it provides sufficient reinforcement to resist deflection and deformation of the cantilevered portion 16. The figures illustrate embodiments of the body structure 10 using the fender panel as the first body panel 12 and a hood panel as the second body panel 14. However, the figures are not meant to be limiting. It is contemplated that embodiments of the body panel support bracket 24 disclosed herein can be used with any adjacent body panels defining a parting line 15 where one body panel has a cantilevered portion 16. Such body panels can include, for example, doors, trunk lids, other closure panels, and other stationary body panels.

As shown in FIGS. 2 and 4, the body structure 10 can have a fixed rigid portion of a vehicle frame, such as a ledge 28. The first body panel 12 can include a first attachment portion 30 and a second attachment portion 32, both of which attach to the ledge 28. The attachment portions 30, 32 can be attached to the ledge 28 with fasteners 34 such as bolts or other fasteners known to those skilled in the art. The two attachment portions 30, 32 are not meant to be limiting. Additional attachment portions are contemplated while not being illustrated. Attachment of the first body panel 12 to the ledge 28 is provided by way of example and is not meant to be limiting. The first body panel 12 can be attached with the attachment portions 30, 32 to other rigid structures of the vehicle frame, such as the firewall. As shown, the cantilevered portion 16 is located between the first attachment portion 30 and the second attachment portion 32 of the first body panel 12, such that at least the distal end 52 of the cantilevered portion 16 is prevented from receiving direct support by one of the attachment portions 30, 32. The cantilevered portion 16 can be located anywhere between the attachment portions 30, 32 and is not limited to the position or orientation shown in the figures.

The panel hinge 18 includes a pivot 36 coupling the base portion 22 and the hinge arm 20. The base portion 22 can include a ledge attachment portion 38 with which the base portion 22 is attached to the ledge 28. The ledge attachment portion 38 can be attached to the ledge 28 with fasteners 34 such as bolts or other fasteners known to those skilled in the art. The ledge attachment portion 38 can have one or more apertures 40 each receiving a fastener 34.

Figure 7:
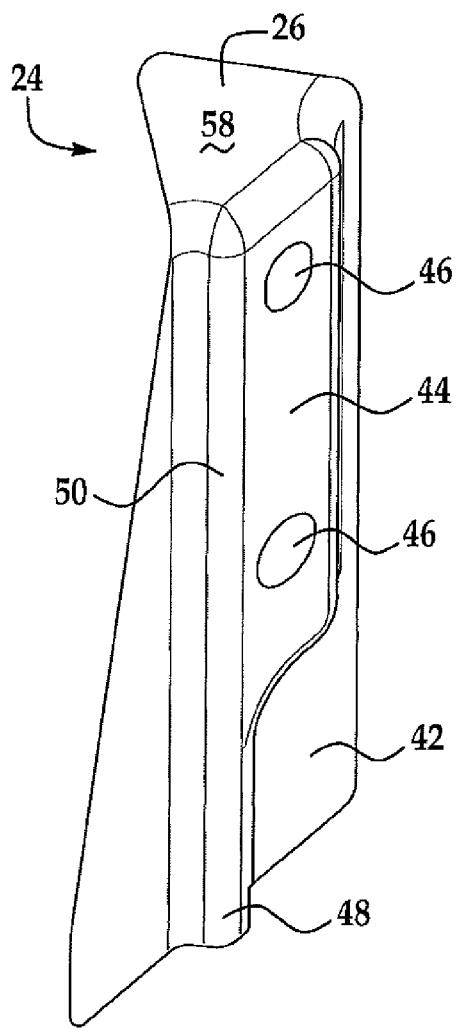
FIG. 7 is a perspective view of the fender support bracket.
Figure 8:
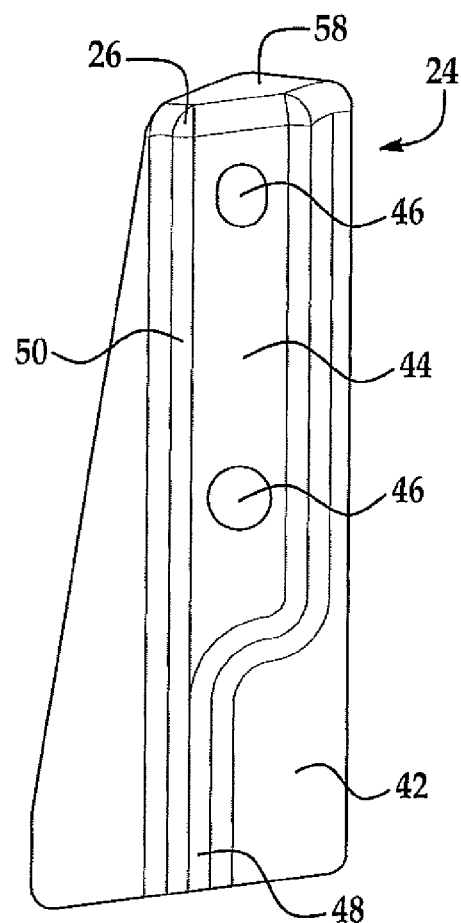
FIG. 8 is an outer side view of the fender support bracket.

As best seen in FIGS. 7 and 8, the body panel support bracket 24 has a mounting portion 42 and a body portion 44 extending between the body panel support portion 26 and the mounting portion 42. The body portion 44 and body panel support portion 26 are substantially perpendicular to each other so that when installed, the body portion 44 extends substantially vertically and the body panel support portion 26 extends substantially horizontally. The body panel support bracket 24 has a pair of locating apertures 46 formed in the body portion 44 and configured to receive a corresponding pair of locating pins to install the body panel support bracket 24 to the panel hinge 18 in the required alignment.

The mounting portion 42 of the body panel support bracket 24 is attached to the base portion 22 of the panel hinge 18 once the body panel support bracket 24 is properly aligned with the locating pins. The mounting portion 42 is attached to the base portion 22 with spot welding, for example, or any other attachment means known to those skilled in the art. The base portion 22 is positioned between the hinge arm 20 and the body panel support bracket 24 to allow for movement of the hinge arm 20 about the pivot 36. It is contemplated that the mounting portion 42 of the body panel support bracket 24 be attached to a different fixed rigid portion of the body structure 10 such as the ledge 28 as desired or required by those skilled in the art considering the cost of materials, weight of materials and installation of the bracket 24, so long as support is provided to the cantilevered portion 16 in a location and direction in direct alignment between the distal end 52 and the fixed rigid portion of the body structure 10.

The mounting portion 42 includes an attachment retention bead 48 to strengthen the mounting portion 42. The attachment retention bead 48 resists movement of the mounting portion 42 away from the base portion 22 of the panel hinge 18 when force is exerted on the body panel support bracket 24. The attachment retention bead 48 can be a single bead or a plurality of beads on the mounting portion 42. The body portion 44 includes a deformation control bead 50 to provide additional strength to the body panel support bracket 24 and is configured to resist deformation of the body portion 44 when force is exerted on the body panel support bracket 24. The deformation control bead 50 can be a single bead or a plurality of beads on the body portion 44. The attachment retention bead 48 and the deformation control bead 50 can also form one continuous bead across the mounting portion 42 and the body portion 44, as shown in the figures, to simultaneously resist separation of the mounting portion 42 from the base portion 22 of the panel hinge 18 and control deformation of the body panel support bracket 24 upon application of a force.

Figure 5:
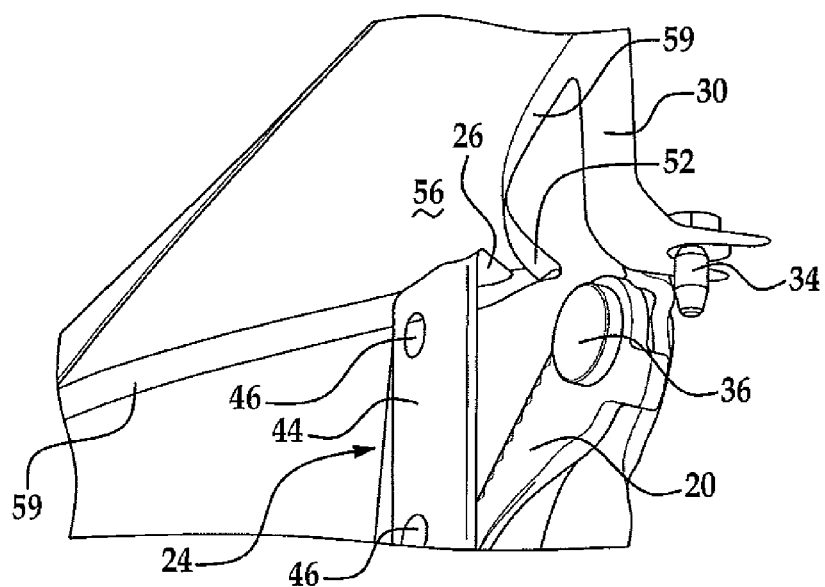
FIG. 5 is an outer side elevational view of the fender panel, with the fender panel partially cut-away to show the hood hinge and the fender support bracket.
Figure 6:
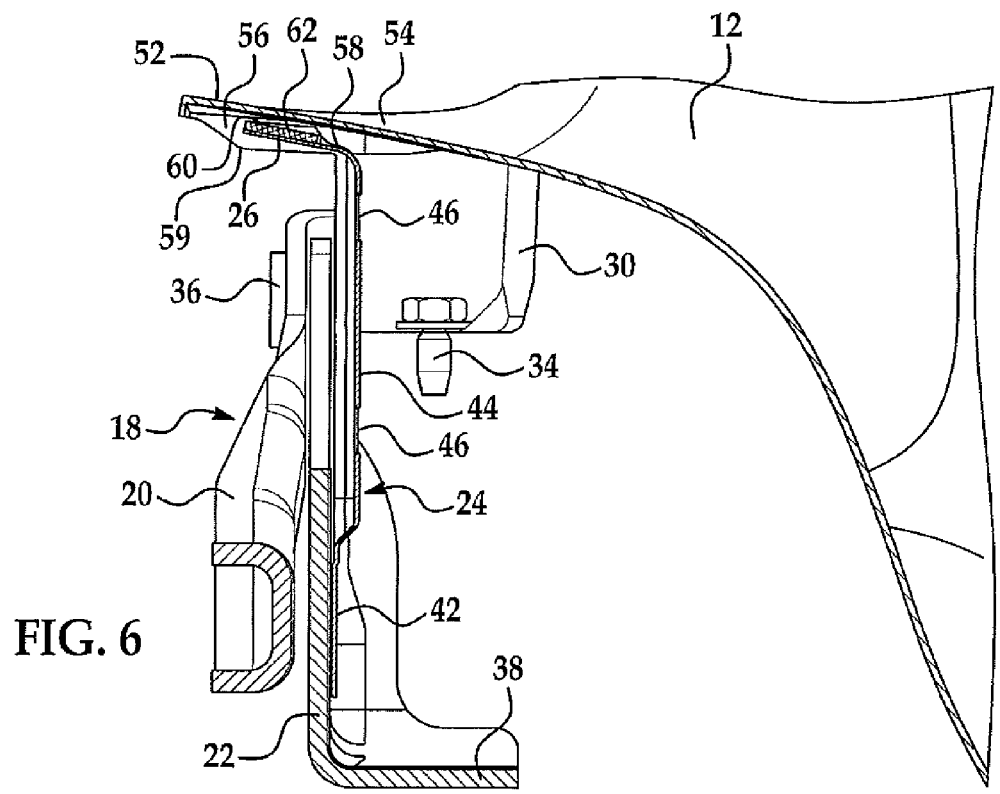
FIG. 6 is a cross sectional view along line 6-6 of FIG. 4 of the fender panel, hood hinge, and fender support bracket.

Referring to FIGS. 5 and 6, the cantilevered portion 16 has a distal end 52 that extends over the panel hinge 18. The cantilevered portion 16 also has an outer surface 54 and an inner surface 56. The body panel support portion 26 of the body panel support bracket 24 has a support surface 58 that conforms to the shape of at least a portion of the distal end 52 of the cantilevered portion 16. As illustrated in the figures, the distal end 52 is triangular in shape and accordingly, the support surface 58 is also triangular. The illustrated shape is not meant to be limiting and other shapes are contemplated. A flange 59 is shown extending from the cantilevered portion 16 of the first body panel 12. The flange 59 can extend from the entire cantilevered portion 16 or only part of the cantilevered portion 16. The flange 59 can span at least a portion of the body panel support portion 26 such that the body panel support portion 26 can be maintained in position to support the cantilevered portion 16.

The support surface 58 faces the inner surface 56 of the cantilevered portion 16 so that a gap 60 is formed between the inner surface 56 and the support surface 58 of the body panel support portion 26. The gap 60 can be, for example, approximately 2 mm. This gap 60 allows for minimal deflection of the cantilevered portion 16. The support surface 58 of the body panel support portion 26 contacts the inner surface 56 of the cantilevered portion 16 when force is applied to the cantilevered portion 16 to prevent the cantilevered portion 16 of the first body panel 12 from deflection greater than the minimal deflection allowed by the gap 60. Padding 62 can be provided on either of the support surface 58 or the inner surface 56 of the cantilevered portion 16 to prevent noise or marring of the surfaces 56, 58 that may occur when the surfaces 56, 58 contact each other due to such force on the cantilevered portion 16 of the first body panel 12. The padding 62 can span a portion of the gap 60 so that the gap 60 is smaller, or the padding 62 can span the entire gap 60 such that the padding 62 contacts the other of the inner surface 56 of the cantilevered portion 16 or the support surface of the body panel support bracket 24 when installed. The padding 62 can be, for example, rubber, felt, plastic or the like. As illustrated, the padding 62 is provided on the support surface 58 of the body panel support portion 26. As mentioned, the padding 62 can alternatively be placed on the inner surface 56 of the cantilevered portion 16. When provided on the inner surface 56, the padding 62 does not have to conform to the shape of the support surface 58 and can cover a larger area of the inner surface 56 to ensure that contact is made only between the padding 62 and the support surface 58 of the body panel support portion 26, preventing contact between the inner surface 56 and the support surface 58. Providing the padding 62 on the inner surface 56 can provide flexibility in sizing and shaping of the padding 62.

Figure 9:
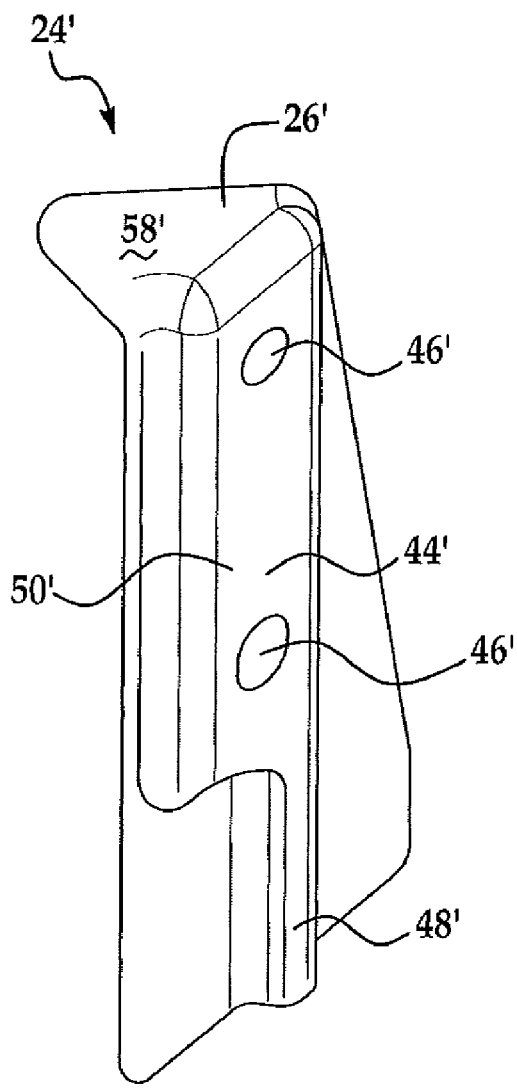
FIG. 9 is a perspective view of another fender support bracket for use on an opposing side of the vehicle.
Figure 10:
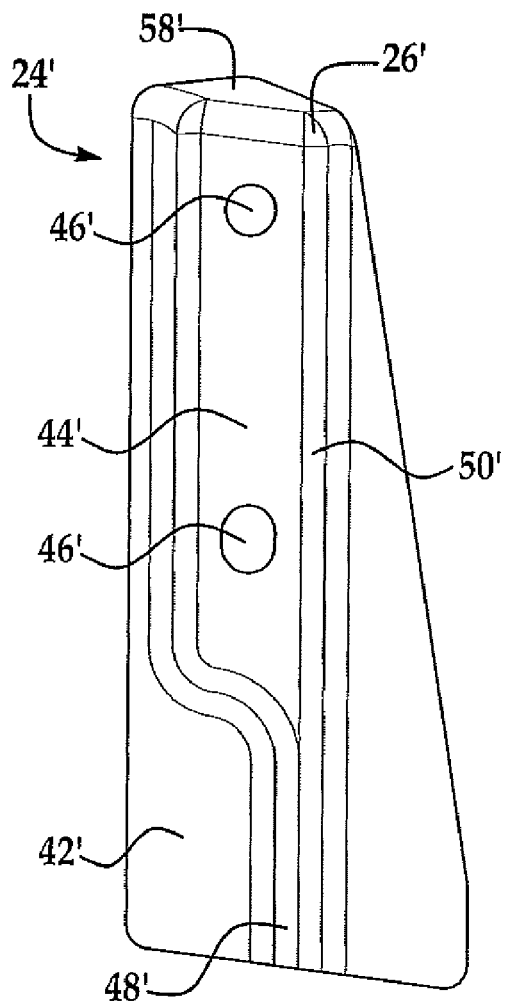
FIG. 10 is an outer side view of the other fender support bracket.

Embodiments of the body structure 10 disclosed herein can incorporate a second body panel support bracket 24' on the opposite side of the vehicle. As vehicle bodies are typically symmetrical, the opposite side of the body structure 10 can have equivalent body panels 12, 14 with the first body panel 12 having a cantilevered portion 16 as described above. To support the cantilevered portion 16 of the opposing side of the body structure 10, a second body panel support bracket 24' can be used, shown in FIGS. 9 and 10. The alignment of the body panel support brackets 24, 24' differ due to the orientations of the body panels and the panel hinges 18. To address the differing alignments, the locating apertures 46 on the first body panel support bracket 24 are in a first arrangement to receive a first set of locating pins, and the locating apertures 46' on the second body panel support bracket 24' are in a second arrangement to receive a second set of locating pins. Because of the different arrangements of the locating apertures 46, 46', the first and second body panel support brackets 24, 24' can each only be placed in one corresponding location. This improves installation efficiency and eliminates incorrect installation.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A body structure for a vehicle comprising:
a first body panel having a cantilevered portion;
a second body panel adjacent the first body panel;
a panel hinge having a hinge arm attached to the second body panel and a base portion, wherein the cantilevered portion of the first body panel extends over a portion of the panel hinge; and
a body panel support bracket attached to the base portion of the panel hinge, the body panel support bracket comprising a body panel support portion located proximate to and a spaced distance from the cantilevered portion of the first body panel.

2. The body structure of claim 1, wherein the body panel support bracket further comprises a mounting portion attached to the base portion of the panel hinge.

3. The body structure of claim 2, wherein the body panel support bracket further comprises a body portion extending between the body panel support portion and the mounting portion.

4. The body structure of claim 3, wherein the mounting portion includes an attachment retention bead to resist movement of the mounting portion away from the base portion of the panel hinge, and the body portion includes a deformation control bead configured to resist deformation of the body portion.

5. The body structure of claim 3, wherein the body portion extends substantially vertically and the body panel support portion extends substantially horizontally.

6. The body structure of claim 1, wherein the cantilevered portion has a distal end and the body panel support portion has a support surface that conforms to a shape of at least a portion of the distal end of the cantilevered portion.

7. The body structure of claim 1, wherein the cantilevered portion has an outer surface and an inner surface and the body panel support portion has a support surface facing the inner surface of the cantilevered portion.

8. The body structure of claim 7, wherein the spaced distance is a gap is formed between the inner surface of the cantilevered portion and the support surface of the body panel support portion, and the body structure further comprises padding provided on one of the support surface and the inner surface of the cantilevered portion, the padding spanning at least a portion of the gap.

9. The body structure of claim 7, wherein the support surface of the body panel support portion contacts the inner surface of the cantilevered portion to prevent the cantilevered portion of the first body panel from further deflection.

10. The body structure of claim 1, further comprising a ledge, wherein the first body panel includes a first attachment portion and a second attachment portion both of which attach to the ledge, the cantilevered portion being located between the first attachment portion and the second attachment portion of the first body panel.

11. The body structure of claim 10, wherein the panel hinge includes a pivot coupling the base portion and the hinge arm; the base portion includes a ledge attachment portion where the base portion is attached to the ledge; and the base portion is positioned between the hinge arm and the body panel support bracket.

12. The body structure of claim 3, wherein the body panel support bracket has a pair of locating apertures formed in the body portion and configured to receive a corresponding pair of locating pins to install the body panel support bracket to the panel hinge.

13. The body structure of claim 12, wherein the body panel support bracket is a first body panel support bracket and the body structure further comprises a second body panel support bracket, wherein the locating apertures on the first body panel support bracket are in a first arrangement to receive a first set of locating pins, and the locating apertures on the second body panel support bracket are in a second arrangement to receive a second set of locating pins, such that the first and second body panel support brackets can each only be placed in one corresponding location.

14. A body structure for a vehicle comprising:
a first body panel having a cantilevered portion;
a second body panel adjacent the first body panel;
a panel hinge having a hinge arm attached to the second body panel and a base portion, wherein the cantilevered portion of the first body panel extends over a portion of the panel hinge; and
a body panel support bracket attached to the base portion of the panel hinge, the body panel support bracket comprising a body panel support portion configured to support the cantilevered portion of the first body panel, wherein the first body panel is a fender panel and the second body panel is a hood panel, with the fender panel and hood panel defining a parting line between them.

15. A body structure for a vehicle comprising:
a hood ledge;
a hood hinge supported by the hood ledge, the hood hinge including a base portion and a hinge arm connected to the base portion at a pivot;
a hood panel movably supported by the hood hinge;
a fender panel adjacent the hood ledge and having a first attachment portion attached to the hood ledge at a first location and a second attachment portion attached to the hood ledge at a second location spaced apart from the first location, and having a cantilevered portion located between the first attachment portion and the second attachment portion, the cantilevered portion extending over a portion of the hood hinge; and
a fender support bracket comprising:
a bracket mounting portion attached to the base portion of the hood hinge;
a body portion extending from the bracket mounting portion; and
a fender support portion extending from the body portion and positioned to support a distal end of the cantilevered portion of the fender panel.

16. The body structure of claim 15, wherein the fender support bracket further comprises a deformation control bead extending along one or both of the bracket mounting portion and the body portion.

17. The body structure of claim 15, wherein the body portion extends substantially vertically and the fender support portion extends substantially horizontally.

18. The body structure of claim 15, wherein the cantilevered portion has an outer surface and an inner surface and the fender support portion has a support surface facing the inner surface of the cantilevered portion.

19. The body structure of claim 18, wherein a gap is formed between the inner surface of the cantilevered portion and the support surface of the fender support portion, and the body structure further comprises padding provided on one of the support surface and the inner surface of the cantilevered portion, the padding spanning at least a portion of the gap.

20. The body structure of claim 18, wherein the support surface of the fender support portion contacts the inner surface of the cantilevered portion to prevent the cantilevered portion of the fender panel from further deflection.

21. A body structure for a vehicle comprising:
 a fixed rigid portion;
 a first body panel having a cantilevered portion;
 a second body panel adjacent the first body panel;
 a panel hinge having a hinge arm attached to the second body panel and a base portion attached to the fixed rigid portion, wherein the cantilevered portion of the first body panel extends over a portion of the panel hinge; and
 a body panel support bracket attached to the fixed rigid portion, the body panel support bracket comprising a body panel support portion configured to provide support to the cantilevered portion, wherein the body panel support bracket is in a location and direction in direct alignment between the cantilevered portion and the fixed rigid portion.

22. The body structure of claim 21, wherein the base portion of the panel hinge is directly attached to the fixed rigid portion, and the body panel support portion is directly attached to the base portion of the panel hinge.

\* \* \* \* \*